United States Patent
Kawashima

(10) Patent No.: US 8,934,274 B2
(45) Date of Patent: Jan. 13, 2015

(54) POWER CONVERSION APPARATUS

(71) Applicant: Fuji Electric Co., Ltd., Kawasaki-shi (JP)

(72) Inventor: Tetsuya Kawashima, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 14/125,924

(22) PCT Filed: Sep. 20, 2012

(86) PCT No.: PCT/JP2012/074121
§ 371 (c)(1),
(2) Date: Dec. 12, 2013

(87) PCT Pub. No.: WO2014/045380
PCT Pub. Date: Mar. 27, 2014

(65) Prior Publication Data
US 2014/0226380 A1 Aug. 14, 2014

(51) Int. Cl.
*H02M 7/521* (2006.01)
*H02M 7/539* (2006.01)
*H02M 7/48* (2006.01)

(52) U.S. Cl.
CPC .............. *H02M 7/539* (2013.01); *H02M 7/48* (2013.01)
USPC .......................................................... 363/98

(58) Field of Classification Search
USPC ................................. 363/95, 97, 98, 131, 132
See application file for complete search history.

(56) References Cited

U.S. PATENT DOCUMENTS

| 4,772,996 | A | | 9/1988 | Hanei et al. |
| 4,777,578 | A | | 10/1988 | Jahns |
| 5,719,519 | A | * | 2/1998 | Berringer ....................... 327/423 |
| 6,181,587 | B1 | * | 1/2001 | Kuramoto et al. ............... 363/98 |
| 7,483,279 | B2 | * | 1/2009 | Lee ................................... 363/41 |
| 7,626,838 | B2 | * | 12/2009 | Gunji .......................... 363/56.04 |
| 2003/0048086 | A1 | | 3/2003 | Takahashi et al. |

FOREIGN PATENT DOCUMENTS

| JP | S63-61962 A | 3/1988 |
| JP | S63-80774 A | 4/1988 |
| JP | H01-214267 A | 8/1989 |
| JP | 2000-134955 A | 5/2000 |
| JP | 2003-274667 A | 9/2003 |
| JP | 2007-195249 A | 8/2007 |
| JP | 2007-274747 A | 10/2007 |

* cited by examiner

*Primary Examiner* — Gary L Laxton
(74) *Attorney, Agent, or Firm* — Rabin & Berdo, P.C.

(57) ABSTRACT

A current flowing into one of half-bridge circuits of a power semiconductor module is detected by corresponding ones of current detection circuits through a current detection terminal provided in corresponding ones of semiconductor switching devices forming the half-bridge circuits and a current detection terminal provided in corresponding ones of flywheel diodes back-to-back connected to the corresponding ones of the semiconductor switching devices. A pulse voltage waveform indicating the current detected by the corresponding ones of the current detection circuits is held for a predetermined period and converted into a stepwise voltage waveform by use of corresponding ones of sample-and-hold circuits, so that the voltage held by the corresponding ones of the sample-and-hold circuits is transmitted to a control circuit through corresponding ones of insulating circuits.

6 Claims, 13 Drawing Sheets

FIG. 6A OUTPUT VOLTAGE OF ADDER

FIG. 6B OUTPUT VOLTAGE OF SAMPLE-AND-HOLD CIRCUIT

FIG. 6C OUTPUT VOLTAGE OF INSULATING CIRCUIT

OUTPUT OF ADDER

OUTPUT OF INSULATING CIRCUIT

POWER CONVERSION APPARATUS

BACKGROUND

1. Technical Field

The present invention relates to a power conversion apparatus in which a power semiconductor module having a plurality of semiconductor switching devices and a control circuit driving the plurality of semiconductor switching devices to be switched individually are separately isolated from each other.

2. Background Art

A power conversion apparatus which has semiconductor switching devices such as IGBTs driven to be switched to form an inverter apparatus, a chopper circuit, or the like, is used widely for various purposes. FIG. 10 is a schematic configuration diagram of an inverter apparatus which drives a three-phase AC motor (load) M. This inverter apparatus has a power semiconductor module 10 in which a plurality of (six) semiconductor switching devices (IGBTs) Q1 and Q2 to Q6 are packaged, and a control circuit 20 which drives the respective semiconductor switching devices Q1 and Q2 to Q6 to be ON/OFF while associating the semiconductor switching devices Q1 and Q2 to Q6 with one another.

Every two of the semiconductor switching devices Q1 and Q2 to Q6 are connected in series while paired with each other to form three half-bridge circuits HBs respectively. These half-bridge circuit HBs are provided in parallel to form a circuit for driving the load M. In addition, a plurality of (six) flywheel diode D1 and D2 to D6 are back-to-back connected to the semiconductor switching devices Q1 and Q2 to Q6 respectively. The half-bridge circuits drive the load M in such a manner that currents with three phases (U phase, V phase, and W phase), each 120° apart from the other two, are fed to the load M from a series connection junction of the semiconductor switching devices Q1 and Q4 forming a half-bridge circuit, a series connection junction of the semiconductor switching devices Q2 and Q5 forming a half-bridge circuit and a series connection junction of the semiconductor switching devices Q3 and Q6 forming a half-bridge circuit, respectively.

On the other hand, the control circuit 20 has a control portion 22 which includes an arithmetic unit 21 such as a CPU and which generates control signals for controlling the semiconductor switching devices Q1 and Q2 to Q6 to be ON/OFF respectively in accordance with output currents of the half-bridge circuits. Further, the control circuit 20 has a drive circuit 23 which outputs gate drive signals Vg1 and Vg2 to Vg6 for driving the semiconductor switching devices Q1 and Q2 to Q6 respectively to be ON/OFF in accordance with the control signals generated by the control portion 22.

Incidentally, information about output currents of the semiconductor switching devices Q1 and Q2 to Q6 necessary for control operation made by the control portion 22 can be obtained, for example, in such a manner that the output currents of the half-bridge circuits are detected by use of current transformers CTs respectively. However, the semiconductor switching devices Q and the flywheel diodes D have been recently provided with current detection terminals so that the current detection terminals can be used for detecting currents flowing in the semiconductor switching devices Q and the flywheel diodes D respectively to thereby obtain the control information (e.g. see PTL 1 and PTL 2, identified further on).

Incidentally, the currents flowing in the semiconductor switching devices Q and the flywheel diodes D respectively are detected by use of current detection circuits 11a and 11b to 11f connected to the current detection terminals respectively. Further, the currents which are detected by the current detection circuits 11 (11a and 11b to 11f) respectively and which flow in the semiconductor switching devices Q and the flywheel diodes D during positive and negative half-cycles respectively are combined by adders 12 (12a and 12b to 12c) as shown in FIG. 10 to thereby obtain one-cycle's currents which flow through the half-bridge circuits respectively.

Incidentally, for example, each of the output currents of the half-bridge circuits detected by use of the current transformers CTs or the like has a sine-wave current waveform as shown in FIG. 11(a). The output current with only one phase is illustrated here. However, for example, each of the currents detected through the current detection terminals of the semiconductor switching devices Q and the flywheel diodes D has a discrete-pulsed sine-wave current waveform synchronized with a switching operation period of the semiconductor switching device Q as shown in FIG. 11(b).

CITATION LIST

Patent Literature

PTL 1: JP-A-2000-134855
PTL 2: JP-A-2003-274667

Incidentally, from the viewpoint of safety, the aforementioned inverter apparatus (power conversion apparatus) requires electrical isolation between the power semiconductor module 10 to which, for example, a large current and a high voltage are applied and the control circuit 20. For example, this electrical isolation can be achieved by provision of insulating circuits 13 (13a, 13b and 13c) between the adders 12 (12a, 12b and 12c) and the arithmetic unit 21 and provision of an insulating circuit 24 between the control portion 22 and the drive circuit 23 as shown in FIG. 12. For example, each of these insulating circuits 13 and 24 is made of an insulating amplifier which modulates a voltage signal to apply the modulated voltage signal to a primary side of a transformer and which demodulates a signal outputted from a secondary side of the transformer to restore the voltage signal.

The insulating circuit 24 provided on the drive side of the semiconductor switching devices Q1 and Q2 to Q6 does nothing but transmit ON/OFF control signals (digital signals) to the semiconductor switching devices Q1 and Q2 to Q6 respectively. On the other hand, the insulating circuits 13 provided in a feedback system need to transmit output voltages (analog signals) of the adders 12 with discrete sine-wave current waveforms as shown in FIG. 11(b). For this reason, signal transmission through the insulating circuits 13 has a problem which will be described below.

That is, the output voltages of the adders 12 correspond to currents flowing intermittently in the semiconductor switching devices Q and the flywheel diodes D in sync with the switching of the semiconductor switching devices Q. Each of the output voltages of the adders 12 has a pulsed waveform with a variable peak value (voltage) as shown in FIG. 13(a). When such output voltages of the adders 12 are transmitted through the insulating circuits 13, it is undeniable that the output voltages are distorted largely at their leading edges, for example, as shown in FIG. 13(b), due to response characteristics (response delay times) of the insulating circuits 13.

Specifically, assuming that the switching period of each of the semiconductor switching devices Q is 100 μsec and a duty ratio command value for defining an ON width of the semiconductor switching device Q on a lower arm side in each of the half-bridge circuits is 10% (10 μsec), for example, the output voltages of the insulating circuits 13 each having a response delay time of 10 μsec are substantially shaped like triangular waves. Then, the output voltages of the insulating circuits 13 are reduced to about halves of the input voltages of the insulating circuits 13 in terms of average per cycle. Moreover, when the duty ratio command value becomes further smaller, errors of the input and output voltages of the insulating circuits 13 become larger and larger due to the influence of the response delay times of the insulating circuits 13.

In addition, assuming that the duty ratio command value for defining the ON width of the semiconductor switching device Q on an upper arm constituting each half-bridge circuit is 90% (90 μsec), the current waveform detected by the flywheel diode D on a lower arm is a rectangular waveform with a duty ratio of about 10% (about 10 μsec) so that distortion likewise occurs in the output voltage of the insulating circuit 13. Accordingly, signals transmitted through the insulating circuits 13 include large errors remarkably differently from the output voltages of the adders 12. Then, there arises a problem that the control circuit 20 cannot control switching of the semiconductor switching devices Q1 and Q2 to Q6 accurately in accordance with the currents detected as described above.

SUMMARY

The invention is accomplished in consideration of such circumstances. An object of the invention is to provide a power conversion apparatus with a simple configuration in which currents detected through current detection terminals provided in semiconductor switching devices and flywheel diodes respectively can be transmitted accurately to a control circuit through insulating circuits so that switching of the semiconductor switching devices can be controlled stably and accurately.

In order to achieve the aforementioned object, a power conversion apparatus according to the invention is characterized by including:

a power semiconductor module having one pair or pairs of semiconductor switching devices (e.g. IGBTs) which are connected in series to form one half-bridge circuit (HB) or half-bridge circuits (HBs) and which are driven to be ON/OFF while being associated with one another, and a plurality of flywheel diodes back-to-back connected to the semiconductor switching devices respectively;

a control circuit which is provided to be separately isolated from the power semiconductor module and which drives the semiconductor switching devices to be ON/OFF respectively in accordance with currents flowing in the half-bridge circuits (HBs);

current detection circuits which detect the currents flowing in the half-bridge circuits (HBs) through current detection terminals provided in ones of the semiconductor switching devices forming the half-bridge circuits (HBs) and current detection terminals provided in ones of the flywheel diodes back-to-back connected to the ones of the semiconductor switching devices;

sample-and-hold circuits which hold voltages corresponding to the currents detected through the current detection circuits for a predetermined period of time, for example, a period of time synchronized with the switching period of each of the semiconductor switching devices; and insulating circuits which transmit the voltages held by the sample-and-hold circuits to the control circuit.

Specifically, the current detection circuits include first and second current detectors which, for example, detect the currents flowing into the semiconductor switching devices and the currents flowing into the flywheel diodes respectively, and adders which add outputs of these first and second current detection circuits. Preferably, it is desirable that the first and second current detection circuits have current correction functions which can change voltages of the current detection terminals provided in the semiconductor switching devices and the flywheel diodes respectively to thereby correct the currents detected through the current detection terminals.

Incidentally, the power semiconductor module has six semiconductor switching devices forming three half-bridge circuits corresponding to respective phases of a three-phase AC power source, and six flywheel diodes to form an inverter apparatus for a three-phase AC load.

Alternatively, the power semiconductor module has one pair or two pairs of the semiconductor switching devices forming one half-bridge circuit or two half-bridge circuits, and the flywheel diodes back-to-back connected to the semiconductor switching devices respectively so that the power semiconductor module and an output circuit connected to an output terminal of the one half-bridge circuit or output terminals of the two half-bridge circuits through inductance form a converter apparatus for controlling a current flowing in the inductance to obtain a predetermined voltage in the output circuit.

Incidentally, configuration may be preferably made so that voltage signals given from the sample-and-hold circuits through the insulating circuits are inputted to the control circuit after gains and offsets of the voltage signals are regulated through voltage regulation circuits.

Advantageous Effects of Invention

According to the power conversion apparatus having the aforementioned configuration, voltage signals exhibiting discrete-pulsed sine-wave current waveforms and detected through the current detection terminals provided in the semiconductor switching devices and the flywheel diodes back-to-back connected to the semiconductor switching devices respectively are held by the sample-and-hold circuits operating in sync with the switching operation periods of the semiconductor switching devices respectively. The stepwise variable output voltages of the sample-and-hold circuits are transmitted through the insulating circuits. Accordingly, the voltage signals indicating the magnitudes of the currents detected through the current detection terminals can be given to the control circuit accurately without being affected by response characteristics (response delay times) of the insulating circuits.

Accordingly, in the control circuit, control signals for controlling the semiconductor switching devices to be ON/OFF can be generated accurately based on signals inputted through the insulating circuits, so that switching of the respective semiconductor switching devices can be controlled stably.

DETAILED DESCRIPTION

A power conversion apparatus according to an embodiment of the invention will be described below with reference to the drawings.

Figure 1:
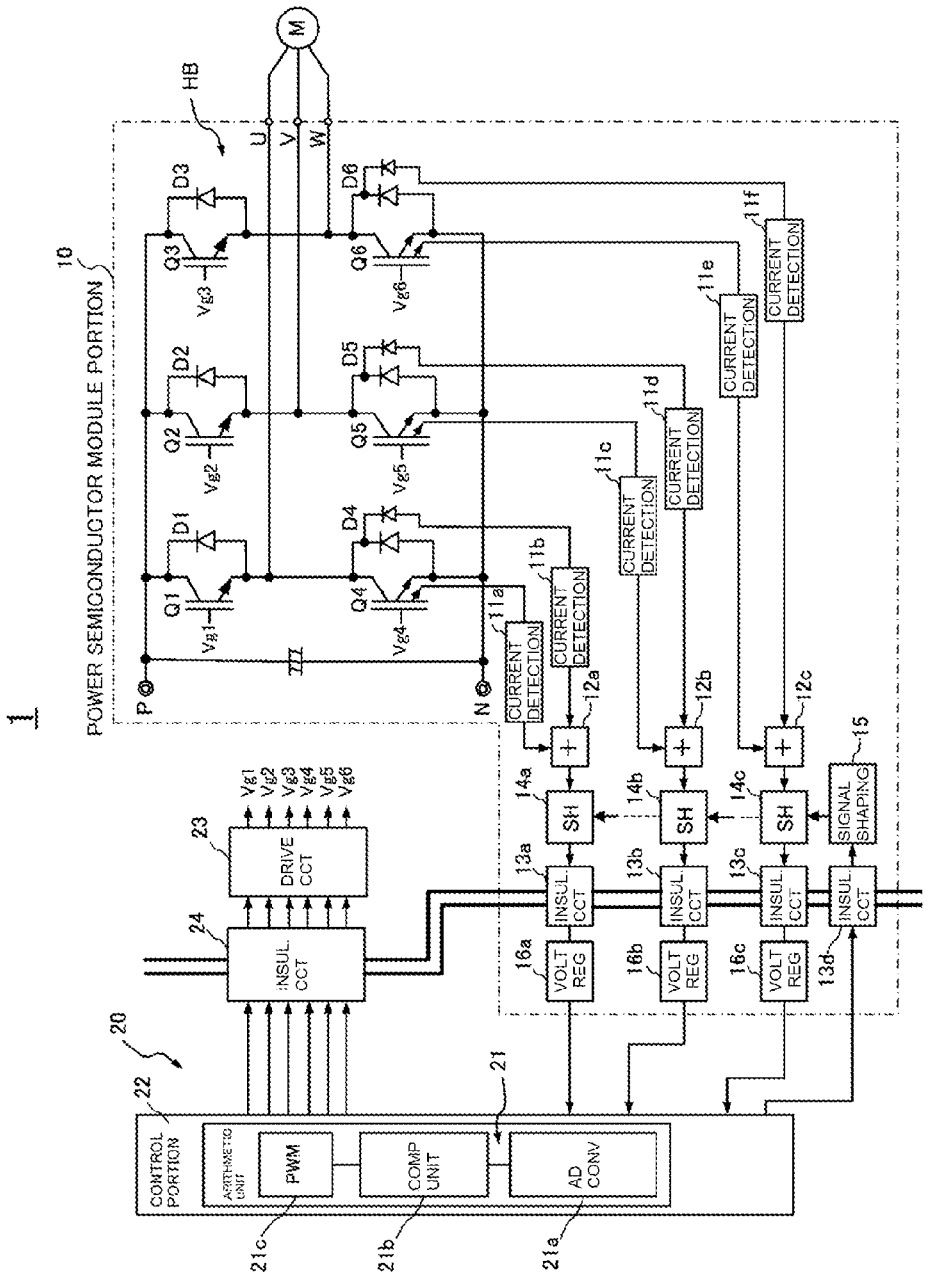
FIG. 1 is a schematic configuration diagram of main part of a power conversion apparatus according to an embodiment of the invention.
Figure 10:
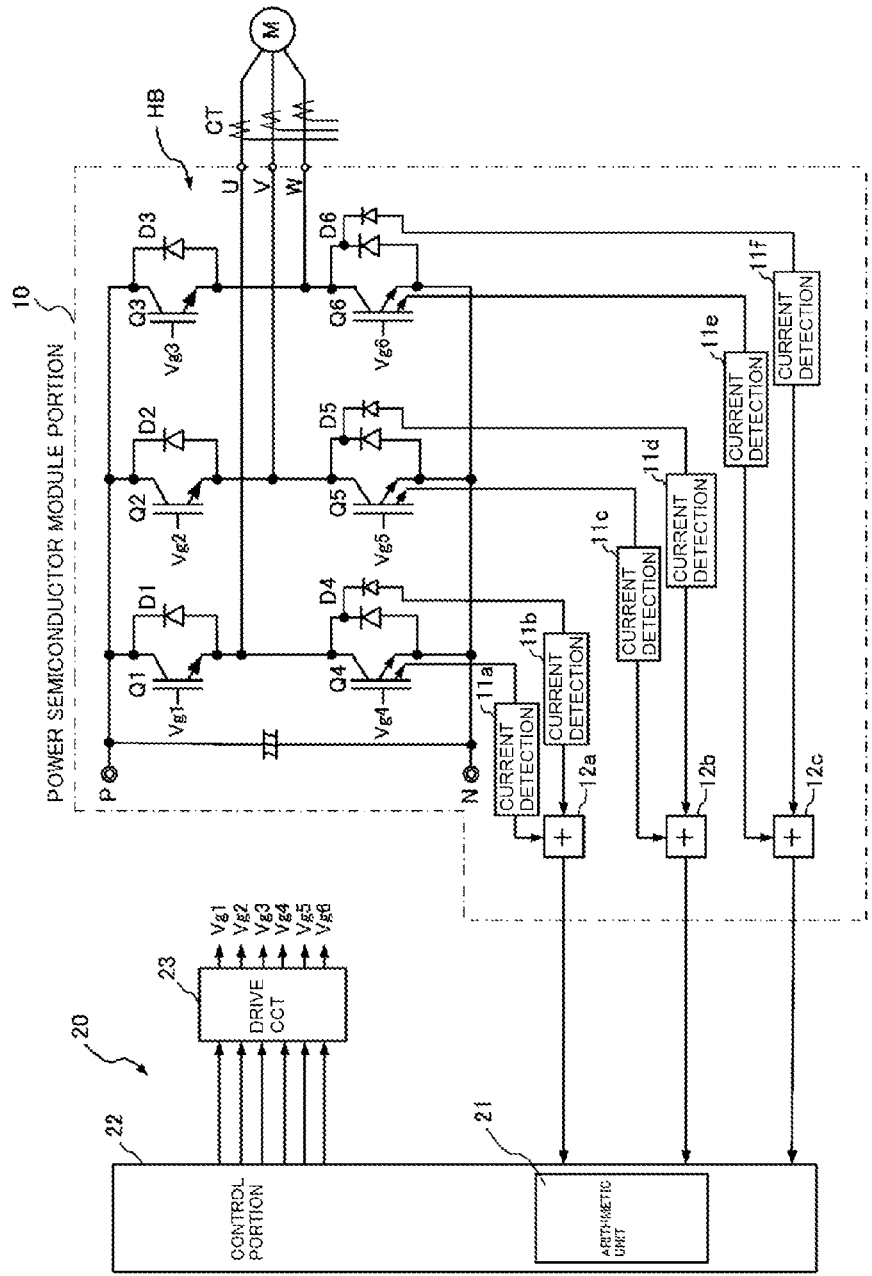
FIG. 10 is a schematic configuration diagram showing a power conversion apparatus according to the background art.
Figure 11:
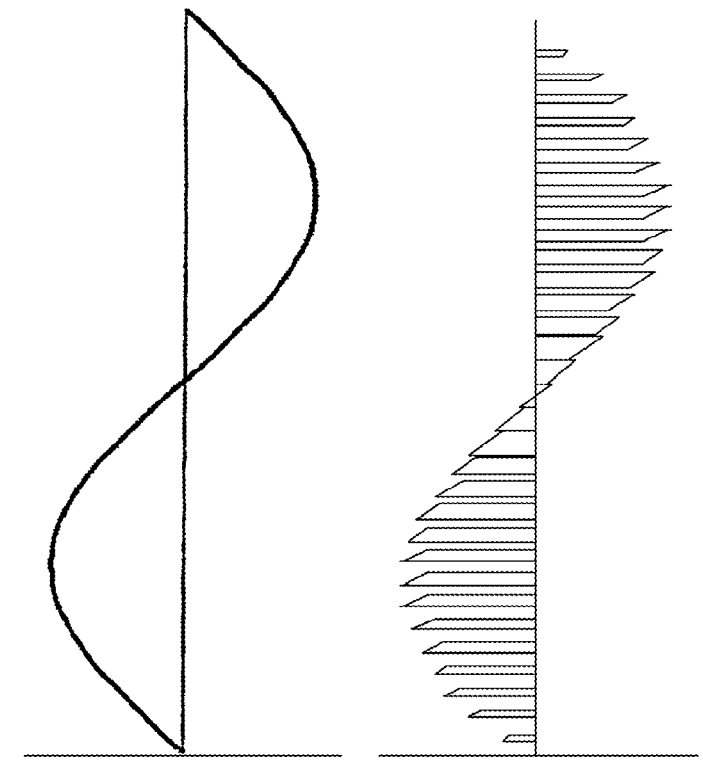
FIG. 11 is a graph showing an output current waveform of each half-bridge circuit and a current waveform flowing into each semiconductor switching device.
Figure 12:
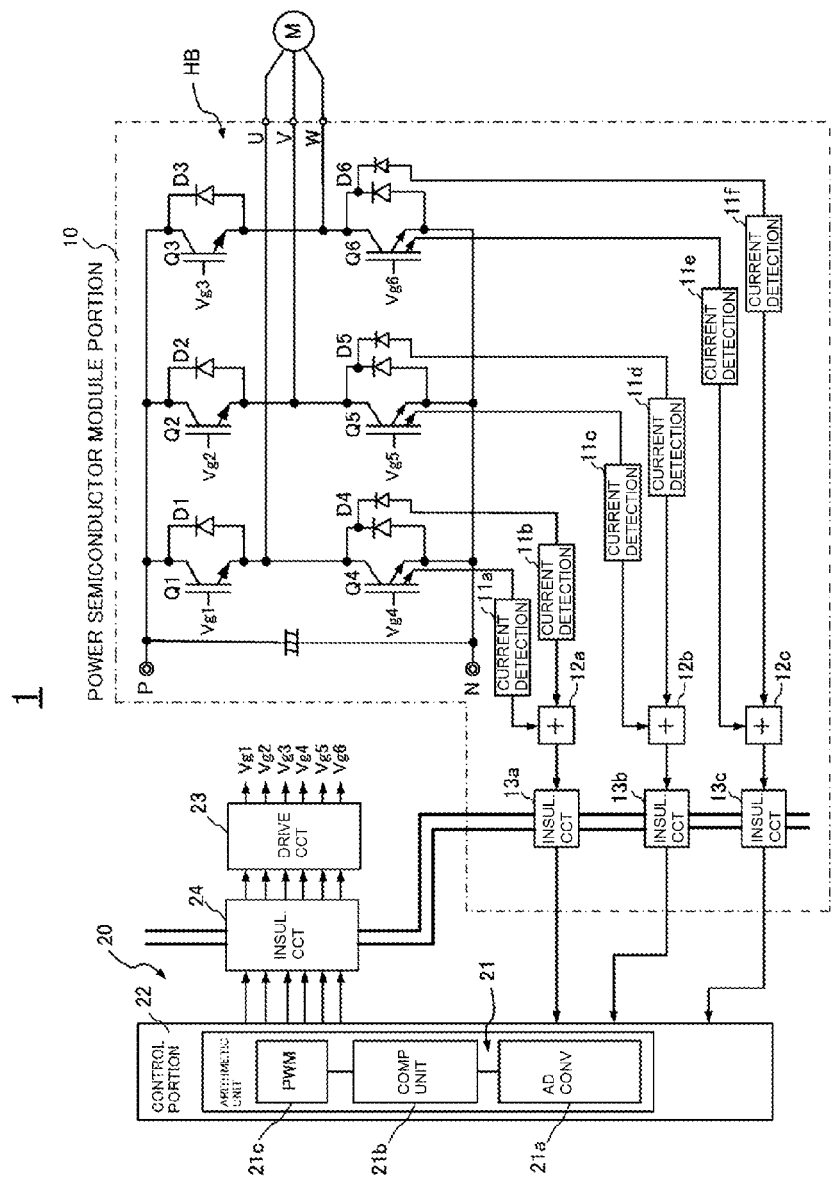
FIG. 12 is a schematic configuration diagram of a background-art power conversion apparatus equipped with insulating circuits.
Figures 13A, 13B:
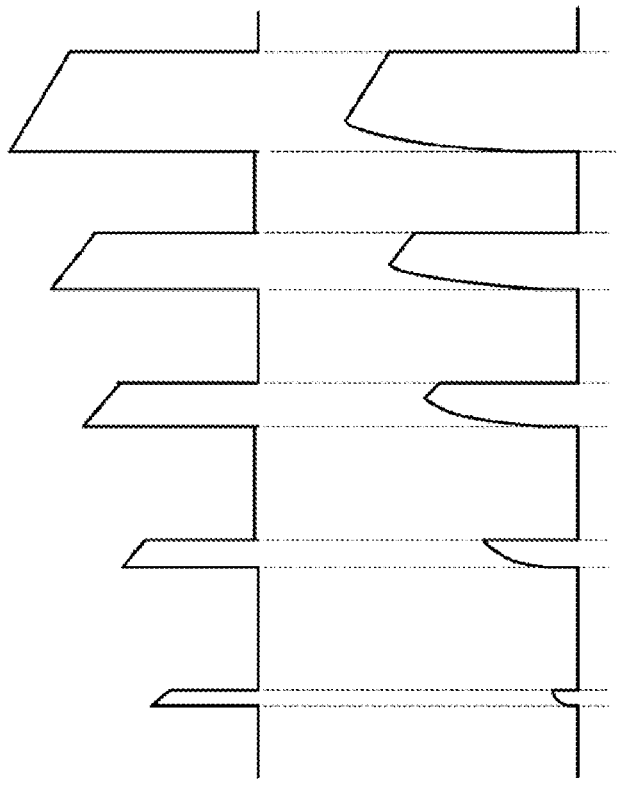
FIG. 13 is a graph showing an input voltage waveform and an output voltage waveform of each insulating circuit.

FIG. 1 is a schematic configuration diagram of a power conversion apparatus 1 according to an embodiment of the invention. Parts the same as those in the background-art apparatus shown in FIG. 10 are referred to by the same signs. The power conversion apparatus 1 according to the embodiment is characterized in that sample-and-hold (SH) circuits 14 (14a, 14b and 14c) which hold output voltages of the adders 12 (12a, 12b and 12c) in sync with the switching periods of the semiconductor switching devices Q respectively are provided so that the insulating circuits 13 (13a, 13b and 13c) transmit the output voltages held by the sample-and-hold circuits 14 (14a, 14b and 14c) respectively to the control circuit 20.

Incidentally, operations of the sample-and-hold circuits 14 (14a, 14b and 14c) are controlled by a waveform shaping circuit 15 which shapes the waveform of a carrier clock signal Fc transmitted from the control circuit 20 through an insulating circuit 13d connected in parallel to the insulating circuits 13a, 13b and 13c. Incidentally, the carrier clock signal Fc is a pulse signal with a duty ratio of 50% to define the switching frequency fc of the semiconductor switching devices Q (Q1 and Q2 to Q6).

To describe the control circuit 20 here in brief, the control circuit 20 generates a triangular wave in sync with rise/falling timing of the pulse signal (carrier clock signal Fc) and compares the triangular wave with a feedback signal fed back from the semiconductor module 10 side. The control circuit 20 obtains a period in which, for example, the level of the triangular wave is higher than the level of the feedback signal, as an ON period of each of the semiconductor switching devices Q (Q1 and Q2 to Q6), and controls (ON/OFF control) each of the semiconductor switching devices Q (Q1 and Q2 to Q6) to be switched under the switching frequency fc.

Figure 2:
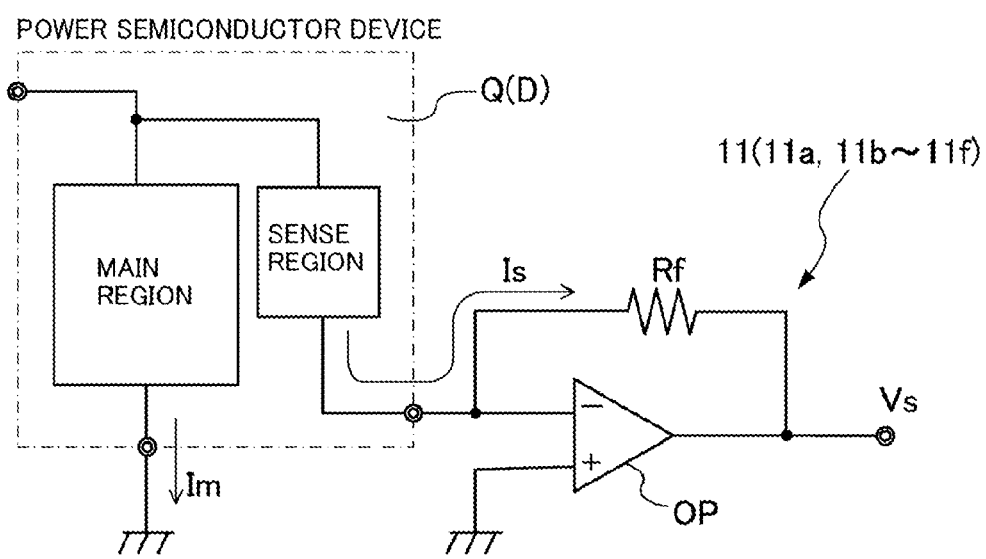
FIG. 2 is a diagram showing a configuration example of a current detection circuit in the power conversion apparatus shown in FIG. 1.

For example, as shown in FIG. 2, each of the current detection circuits 11 (11a and 11b to 11f) is made of an inverting amplifier provided with a feedback resistor Rf between an output terminal and an inverting input terminal of an operational amplifier OP. The current detection circuit 11 is configured so that a current Is outputted from a current detection terminal of the semiconductor switching device Q or the flywheel diode D is inputted to the operational amplifier OP so that an output voltage Vs corresponding to the input current Is can be obtained as an output of the operational amplifier OP. Incidentally, the current Is outputted from the current detection terminal is proportional to a main current flowing in the semiconductor switching device Q or the flywheel diode D. It is hardly necessary to say, but the current Is is generally set to be about one part in several thousands equal parts of the main current.

Figure 3:
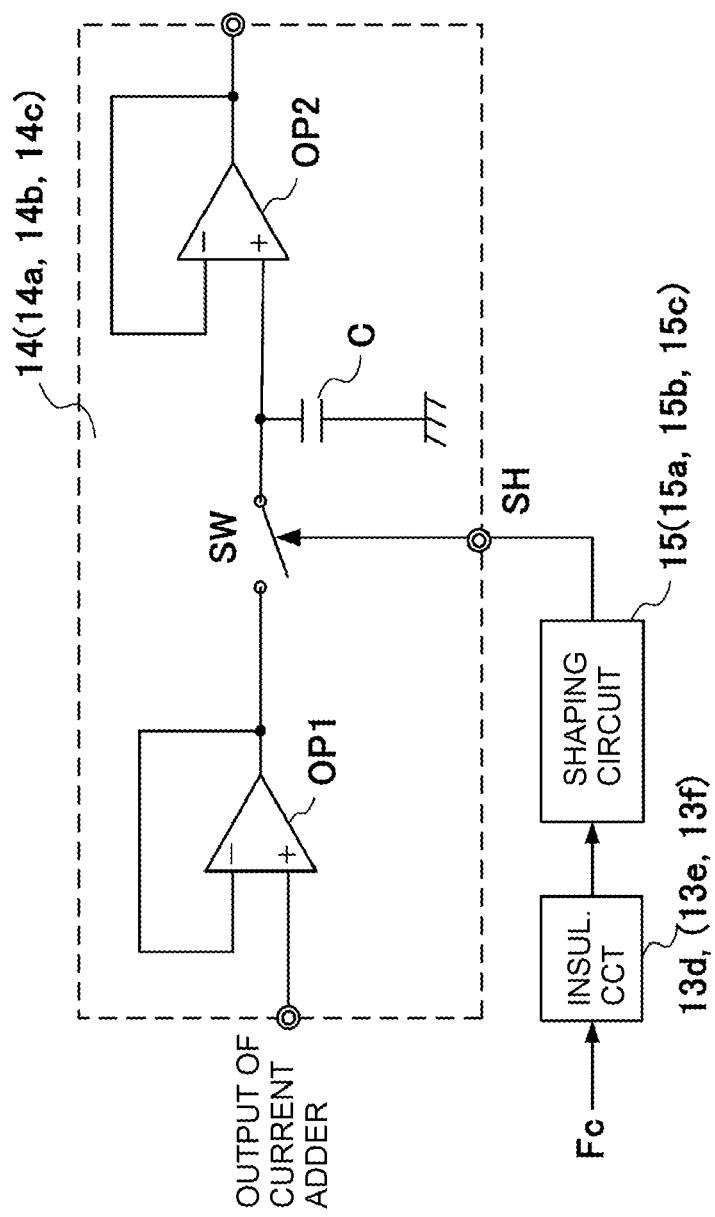
FIG. 3 is a diagram showing a configuration example of a sample-and-hold circuit in the power conversion apparatus shown in FIG. 1.

For example, as shown in FIG. 3, the sample-and-hold circuit 14 has an input buffer made of an operational amplifier OP1, and an output buffer made of an operational amplifier OP2. Configuration is made so that the output voltage of the input buffer is sampled through a switch device SW and held in a capacitor C and the voltage held in the capacitor C is given to the output buffer.

Figure 4:
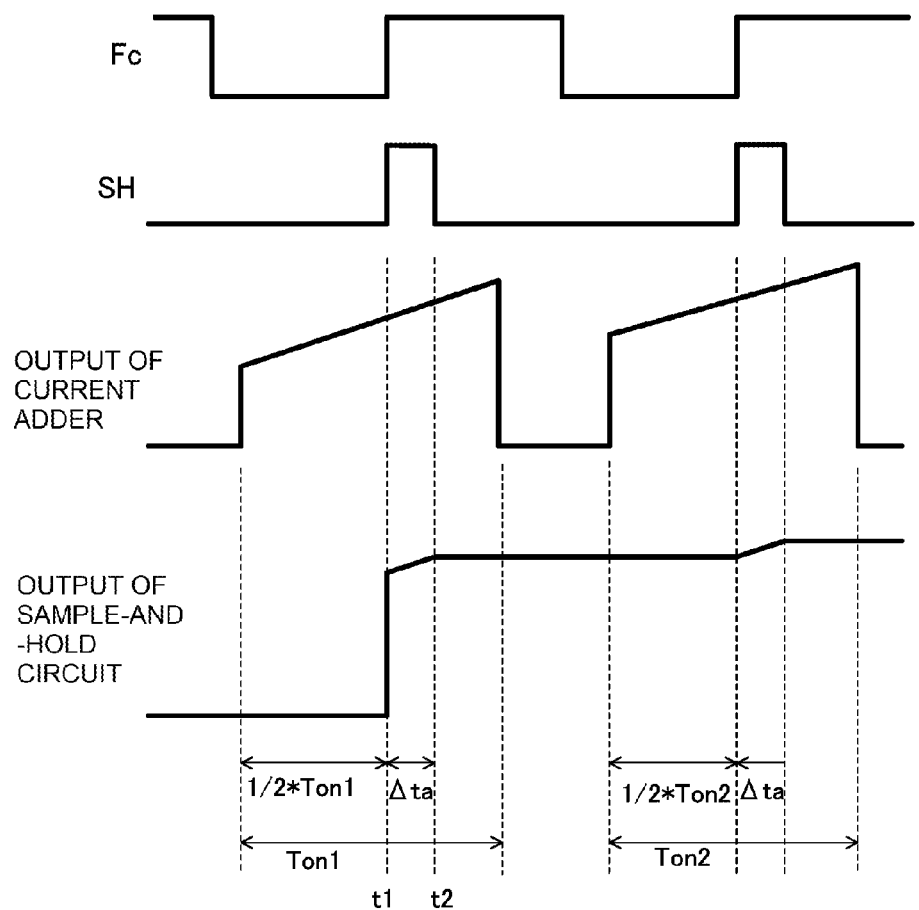
FIG. 4 is a signal waveform graph showing operation of the sample-and-hold circuit.

The switch devices SWs of the sample-and-hold circuits 14 (14a, 14b and 14c) configured thus are driven by the output of the waveform shaping circuit 15 so that the output voltages of the adders 12 (12a, 12b and 12c) are sampled and held in sync with switching of the semiconductor switching devices Q, for example, as shown in FIG. 4. Specifically, the sample-and-hold circuits 14 sample the output voltages of the adders 12 (12a, 12b or 12c), for example, in midmost timings (Ton/2) in the ON periods of the semiconductor switching devices Q and the flywheel diodes D, and hold the sampled voltages. As a result, average values of the output voltages of the adders 12 (12a, 12b and 12c) which change like pulses can be obtained as stepwise variable output voltages of the sample-and-hold circuits 14 respectively.

That is, the waveform shaping circuit 15 controls the sampling operations of the sample-and-hold circuits 14 (14a, 14b, and 14c) in accordance with the aforementioned carrier clock signal Fc so that the semiconductor switching devices Q1 and Q2 to Q6 are controlled to be switched individually. The sample-and-hold circuits 14 (14a, 14b and 14c) sample the pulsed output voltages of the adders 12 (12a, 12b and 12c) at the falling timing of the carrier clock signal Fc and hold the sampled output voltages in one period of the carrier clock signal Fc.

As a result, the voltages sampled by the sample-and-hold circuits 14 (14a, 14b and 14c) have average voltage values at timings (Ton/2) of the midmost (½) of the ON periods (Ton) of the semiconductor switching devices Q and the flywheel diodes D. In other words, the output voltages of the sample-and-hold circuits 14 (14a, 14b and 14c) can be obtained as average values per one pulse width of the intermittently pulsed output voltages of the adders 12 (12a, 12b and 12c).

Incidentally, when an ON time Δta of the switch device SW in each of the sample-and-hold circuits 14 (14a, 14b and 14c) is shortened, the capacitor C cannot be charged so sufficiently that the output voltage of each of the adders 12 (12a, 12b and 12c) cannot be held surely. On the other hand, when the ON time Δta of the switch device SW is elongated, an error relative to the average value of the output voltage of each of the adders 12 (12a, 12b and 12c) in the carrier period is increased. Accordingly, in the case where, for example, the carrier period is 100 μsec, it is preferable that the ON time Δta of the switch device SW is set to be about 1 μsec and the capacitance of the capacitor C is set to be about 1 nF to take measures to prevent the sampling error from becoming large. It is however a matter of course that the respective values may be set in accordance with specifications such as current detection conditions and allowable detection errors.

Accordingly, the output voltage of each of the sample-and-hold circuits 14 subjected to sampling control as described above has a stepwise voltage waveform close to a sine wave, in which the average value of the output voltage of each of the adders 12 with a peak value (voltage value) intermittently changing while drawing a discrete sine-wave current waveform is held every switching period. The output voltages of the sample-and-hold circuits 14 are transmitted to the control circuit 20 side through the insulating circuits 13 (13a, 13b and 13c).

When insulating circuits having excellent input output characteristics to transmit their input voltages accurately are used as the insulating circuits 13 (13a, 13b and 13c) here, it is undeniable that response delay times of the insulating circuits 13 (13a, 13b and 13c) are generally long. Assume that insulating circuits 13 (13a, 13b and 13c) having rise times of 10 μsec, for example, between zero voltage (0V) and their maximum voltages are used. Assume that the output current of each of the half-bridge circuits which is a sine wave with a frequency of 100 Hz and with an allowable maximum current as its amplitude is subjected to switching control under a carrier frequency of 10 kHz.

Then, each of the half-bridge circuits is switched 25 times until the output current of each of the half-bridge circuits reaches the maximum value from zero (¼ cycle). Accordingly, the voltage change amount in one carrier period is 1/25 of the range of the maximum output voltage. Accordingly, in this case, the insulating circuits 13 (13a, 13b and 13c) obtain the output voltages following the input voltage waveforms in 400 nsec by simple calculation. Accordingly, the insulating circuits 13 (13a, 13b and 13c) can transmit the output voltages of the aforementioned adders 12 (12a, 12b and 12c) accurately on the safe side.

The output voltages of the sample-and-hold circuits 14 transmitted thus through the insulating circuits 13 (13a, 13b and 13c) are regulated through the voltage regulation circuits (16a, 16b and 16c) respectively and then applied to the control portion 22 in the control circuit 20. Incidentally, the voltage regulation circuits 16 (16a, 16b and 16c) have functions of being capable of controlling gains and offsets with respect to the output voltages of the insulating circuits 13 (13a, 13b and 13c). The arithmetic unit 21 having, for example, a CPU as a main constituent in the control portion 22 fetches the output voltages of the voltage regulation circuits 16 (16a, 16b and 16c) through an AD converter 21a provided in the arithmetic unit 21, and acquires information about currents flowing into the semiconductor switching devices Q and the flywheel diodes D.

The arithmetic unit 21 calculates currents flowing into the semiconductor switching devices Q and the flywheel diodes D respectively by a computing unit 21b based on the information acquired through the AD converter 21a and generates signals (feedback signals) necessary for switching control of the semiconductor switching devices Q (Q1 and Q2 to Q6) in accordance with results of the calculation. For example, a PWM modulator 21c generates control signals with modulated pulse widths for on/off-driving the semiconductor switching devices Q (Q1 and Q2 to Q6) in accordance with the signals (feedback signals) obtained by the computing unit 21b. The control signals generated thus are transmitted to the drive circuit 23 through the insulating circuit 24 so that the gate driving signals Vg1 and Vg2 to Vg6 are generated with a result that the semiconductor switching devices Q (Q1 and Q2 to Q6) are driven to be switched respectively at timings relevant to one another.

Figure 5:
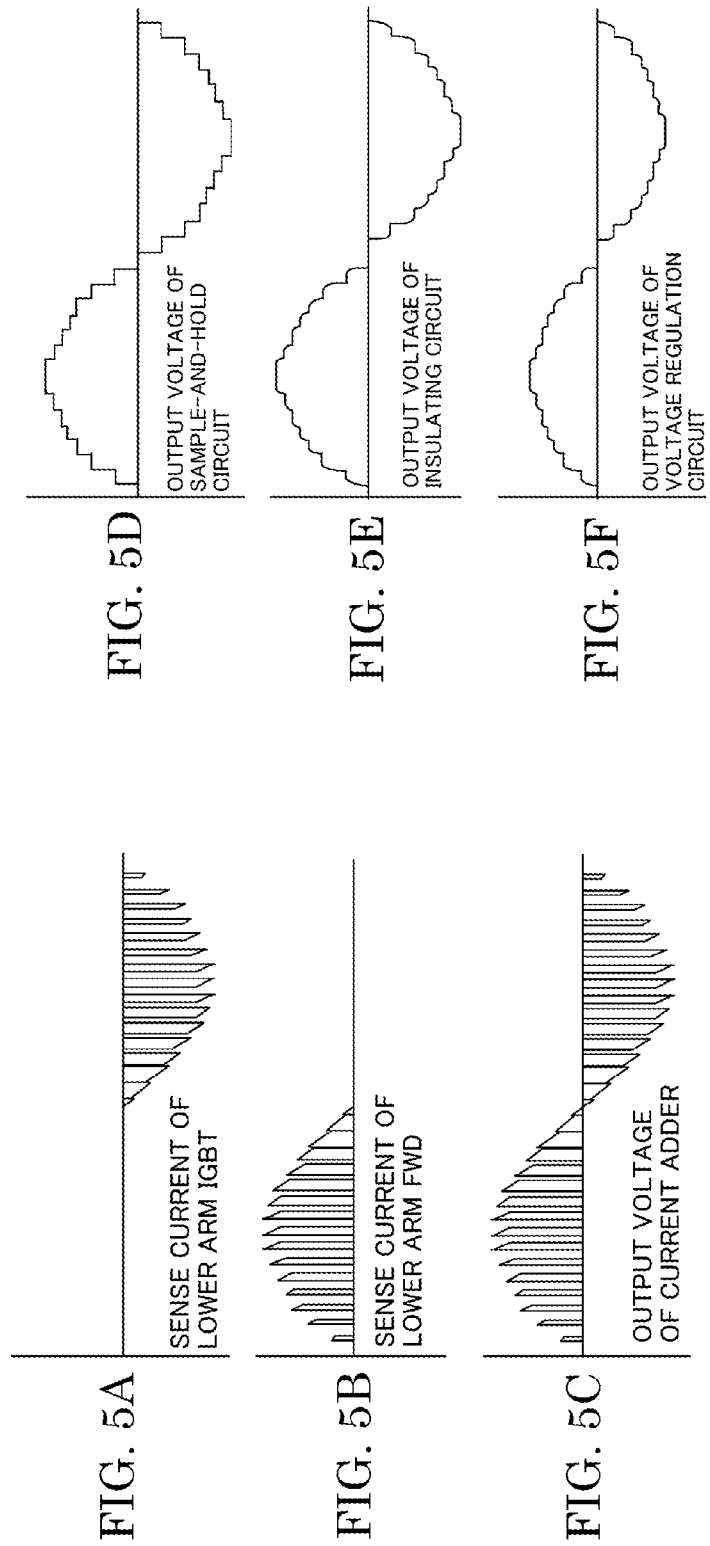
FIG. 5 is a signal waveform graph showing current detection operation in the power conversion apparatus shown in FIG. 1.

The overall operation of the apparatus will be described here. FIG. 5 shows signal waveforms of respective portions in the power conversion apparatus 1 configured as described above for comparison. As shown in FIG. 5, a current drawing a discrete sine wave in a negative half cycle in sync with switching of the semiconductor switching device Q constituting a lower arm of the half-bridge circuit flows in pulses into the semiconductor switching device Q. A sense current proportional to the pulse current is outputted from the current detection terminal of the semiconductor switching device Q. Accordingly, the output voltage of the current detection circuit 11a which detects the sense current has a pulse voltage waveform with a negative half cycle, which changes like pulses while drawing a discrete sine wave, as shown in FIG. 5(a).

In addition, a current drawing a discrete sine wave in a positive half cycle in sync with switching of the semiconductor switching device Q flows in pulses into the flywheel diode D back-to-back connected to the semiconductor switching device Q. The sense current corresponding to this current is outputted from the current detection terminal of the flywheel diode D. Accordingly, the output voltage of the current detection circuit 11b which detects the sense current has a pulse voltage waveform with a positive half cycle, which changes like pulses while drawing a discrete sine wave, as shown in FIG. 5(b).

As a result, the voltage waveform in one cycle obtained in such a manner that the voltages detected by the current detection circuits 11a and 11b respectively are combined by the adder 12a is a pulse voltage waveform which is variable while drawing a discrete sine wave in sync with the switching of the semiconductor switching device Q as shown in FIG. 5(c). The output voltage of the sample-and-hold circuit 14a which samples and holds the output voltage of the adder 12a in sync with the switching of the semiconductor switching device Q is a voltage waveform which is close to a sine wave and in which valleys between pulses of the aforementioned discrete pulse voltage waveform are filled up to make the voltage waveform continuous by the voltage holding function so that the voltage waveform changes stepwise, as shown in FIG. 5(d).

Figure 6:
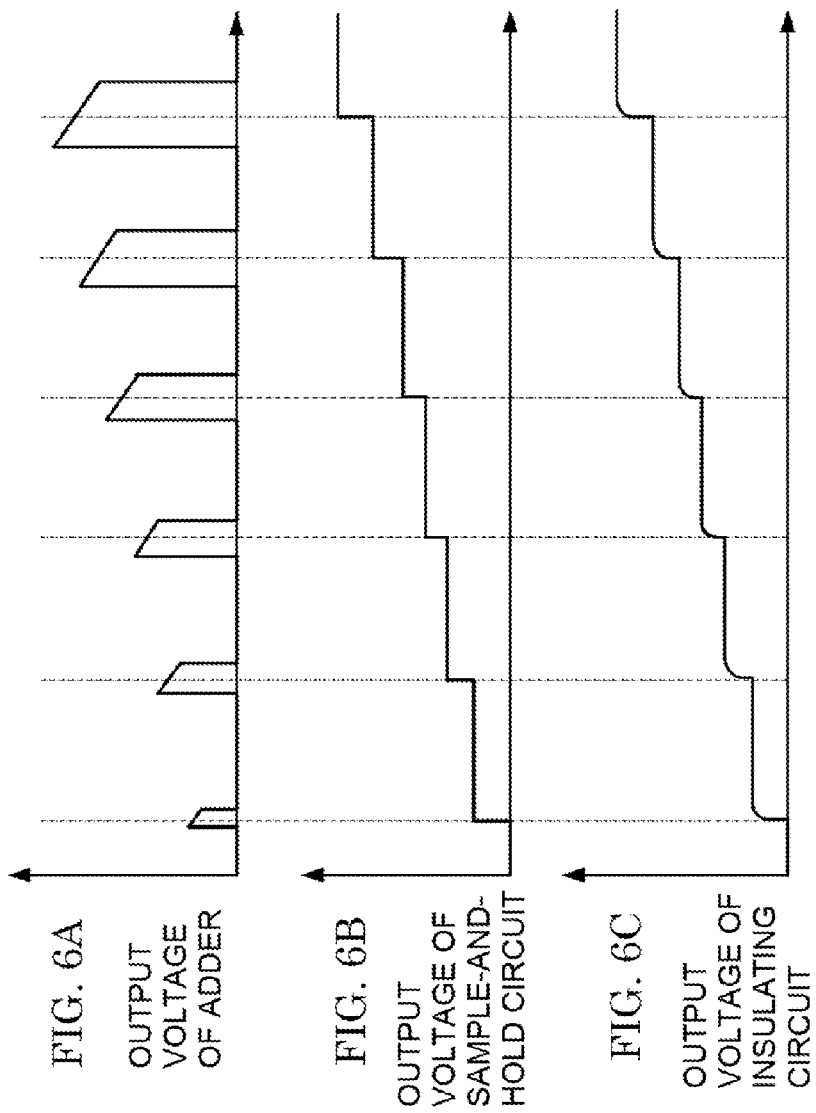
FIG. 6 is a signal waveform graph for explaining a current detection signal transmitting function in the power conversion apparatus shown in FIG. 1.

That is, as shown in FIGS. 6(a) and 6(b) in which the output voltage of the adder 12a and the output voltage of the sample-and-hold circuit 14a are enlarged respectively, the output voltage of the sample-and-hold circuit 14a is a voltage waveform which exhibits transient response change caused by charging/discharging of the capacitor C at the time of sampling, but which is obtained by sampling and holding the output voltage of the adder 12a sequentially so as to change stepwise. Here, the output voltage of the sample-and-hold circuit 14a shows an ideal sample-and-hold waveform when it is assumed that the charging/discharging time of the capacitor C is zero (0) and the [H] period of the sample-and-hold signal is infinitesimal.

When the output voltage of the sample-and-hold circuit 14a drawing such a voltage waveform is transmitted through the insulating circuit 13a, the output voltage of the insulating circuit 13a is a voltage signal waveform which has slight distortion due to the influence of response characteristics of the insulating circuit 13a, as shown in FIG. 5(e), while substantially keeping the change of the output voltage of the sample-and-hold circuit 14a. That is, the output voltage of the insulating circuit 13a is a stepwise voltage waveform which is transmitted while round in accordance with a voltage difference indicating the change of the stepwise output voltage of the sample-and-hold circuit 14a, as shown in FIG. 6(c). Accordingly, the output voltage of the insulating circuit 13a is a voltage waveform which reproduces substantially faithfully the change of an average voltage of the pulse voltage waveform which changes while drawing a discrete sine wave.

The output voltage of the insulating circuit 13a is regulated in accordance with the dynamic range of the AD converter 21a through the voltage regulation circuit 16a and inputted as a feedback signal of a voltage waveform shown in FIG. 5(f) to the arithmetic unit 21. Accordingly, in the arithmetic unit 21, a control signal for controlling the semiconductor switching device Q to be switched can be generated accurately from the current flowing in pulses through the semiconductor switching device Q and the flywheel diode D while using as a feedback signal current information corresponding to the current outputted from the half-bridge circuit in which the semiconductor switching device Q and the flywheel diode D are formed.

Thus, in the power conversion apparatus 1 according to the embodiment, a configuration is used such that the output voltages of the adders 12 (12a, 12b and 12c) are sampled and held in the sample-and-hold circuits 14 (14a, 14b and 14c) in sync with the switching period of each of the semiconductor switching devices Q and the output voltages of the sample-and-hold circuits 14 (14a, 14b and 14c) are transmitted through the insulating circuits 13 (13a, 13b and 13c). As a result, information indicating the output voltages of the adders 12 (12a, 12b and 12c) can be transmitted accurately to the side of the control circuit 20 while being hardly affected by the response delay times of the insulating circuits 13 (13a, 13b and 13c).

Therefore, according to the power conversion apparatus 1 having the aforementioned configuration, the semiconductor switching devices Q (Q1 and Q2 to Q6) can be controlled to be switched at proper timings respectively in accordance with the output currents of the half-bridge circuits even when the semiconductor module 10 side and the control circuit 20 side are separately isolated from each other through the insulating circuits 13 (13a, 13b and 13c). In addition, the change of the voltage signals transmitted through the insulating circuits 13 (13a, 13b and 13c) can be reduced so that errors per se generated by transmission characteristics of the insulating circuits 13 (13a, 13b and 13c) can be reduced. Thus, accurate switching control can be achieved.

Sense currents Is detected through the current detection terminals of the aforementioned semiconductor switching devices Q and the aforementioned flywheel diodes D respectively are proportional to main currents flowing into the semiconductor switching devices Q and the flywheel diodes D respectively, ideally. Each of the current ratios is determined in accordance with an area ratio between a main region and a sense region in the device. It is however undeniable that an error may occur in the current ratio due to differences in the device structure of each device and the region layout.

For example, such an error can be corrected by gain control and offset control by each of the voltage regulation circuits 16a, 16b and 16c. However, when a detection error of the sense current Is is large or when an error in the sense current Is with respect to the main current flowing into the semiconductor switching device Q and the flywheel diode D respectively is nonlinear, it is difficult to accurately correct the error in a wide range by each of the voltage regulation circuits 16a, 16b and 16c.

Figure 7:
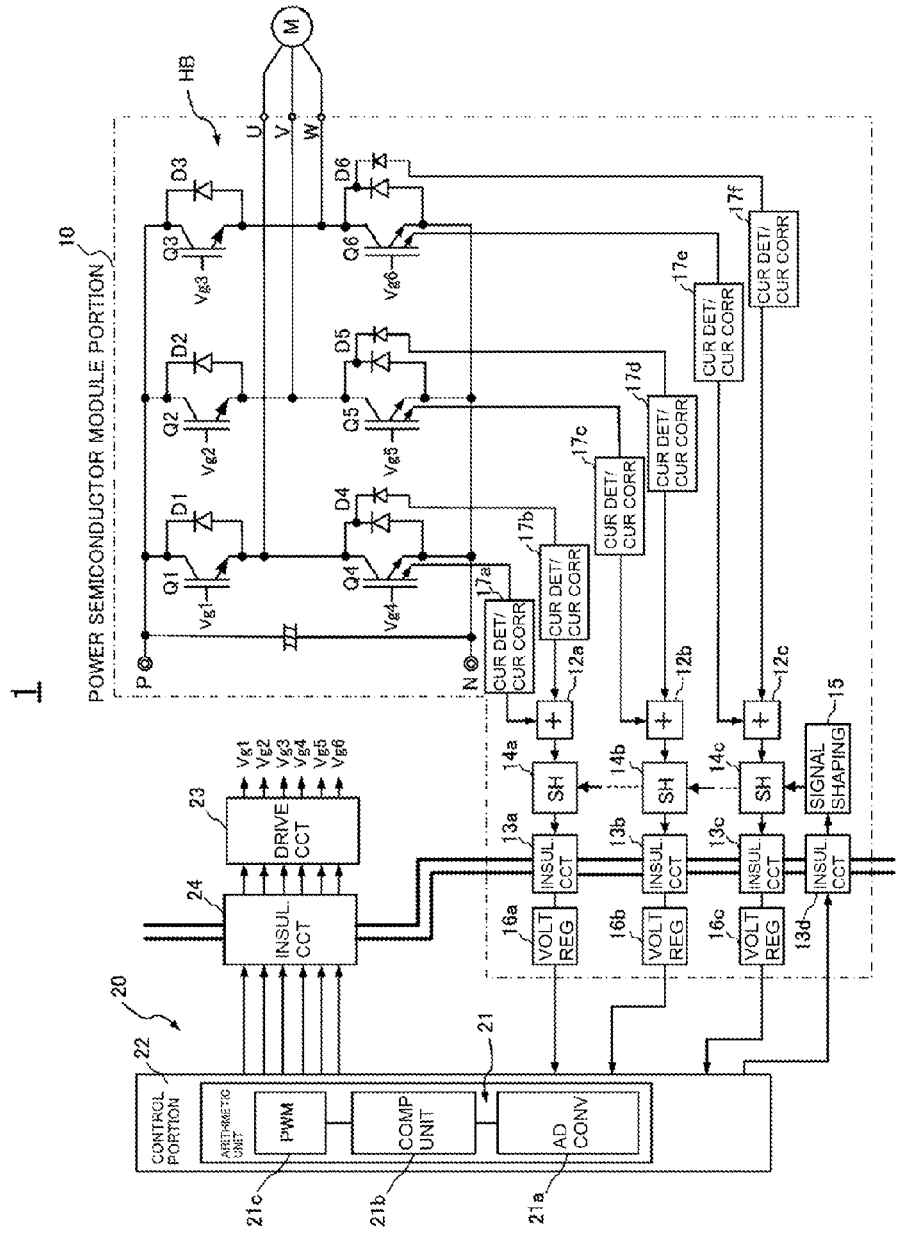
FIG. 7 is a schematic configuration diagram of a main part of a power conversion apparatus according to another embodiment of the invention.
Figure 8:
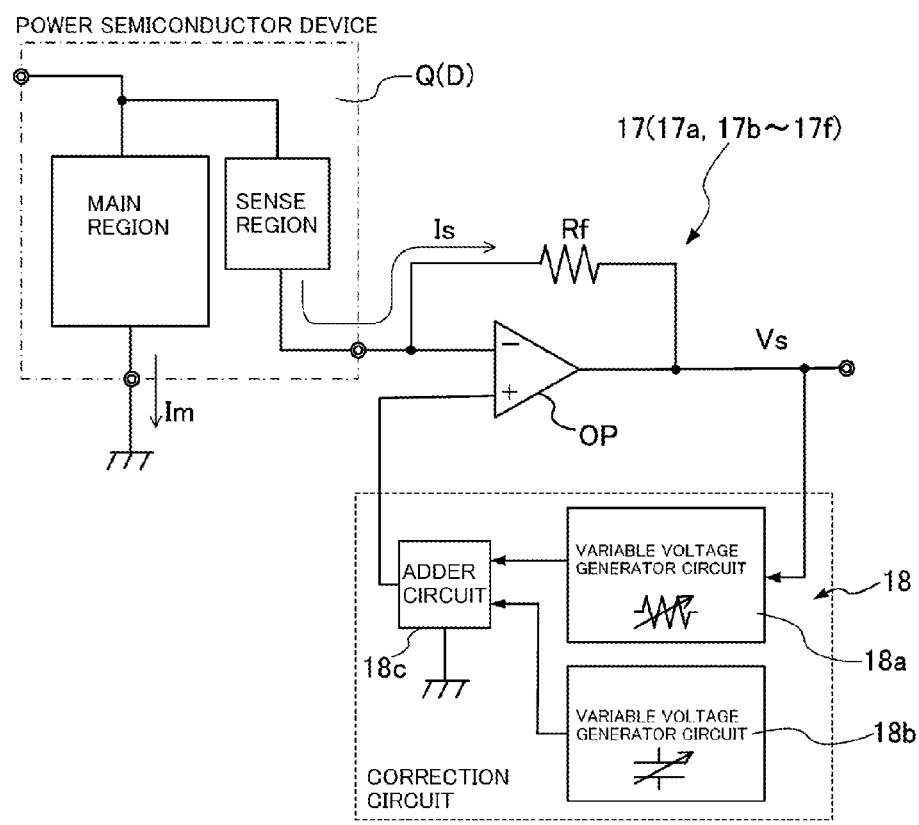
FIG. 8 is a diagram showing a configuration example of a current detection circuit in the power conversion apparatus in FIG. 7.

In case of such a situation, it is therefore desirable that current correction circuits are built into the current detection circuits 11a and 11b to 11f respectively, for example, as shown in FIG. 7. The current detection circuits 17a and 17b to 17f having the current correction circuits built therein are formed, for example, as shown in FIG. 8. That is, a current correction circuit 18 which feeds a voltage corresponding to an output voltage Vs of an operational amplifier OP equipped with a feedback resistor Rf back to a non-inversion terminal of the operational amplifier OP is provided additionally to each current detection circuit 17 of an inversion amplification type constituted by the operational amplifier OP.

Specifically, the current correction circuit 18 includes a first variable voltage generator circuit 18a, a second variable voltage generator circuit 18b, and an adder circuit 18c. The first variable voltage generator circuit 18a generates a voltage corresponding to the output voltage Vs of the operational amplifier OP in the current detection circuit 17. The second variable voltage generator circuit 18b generates a predetermined voltage. The adder circuit 18c adds the output voltages of these variable voltage generator circuits 18a and 18b and applies the sum of the output voltages to the non-inversion terminal of the operational amplifier OP.

Incidentally, the first variable voltage generator circuit 18a includes a variable resistor or a circuit corresponding thereto. When the sense current is larger than the specification, the first variable voltage generator circuit 18a increases the voltage of the non-inversion terminal of the operational amplifier OP by regulation of the variable resistor to thereby reduce only the voltage between the collector and the emitter applied to the sense device portion of the semiconductor switching device (IGBT) Q. Thus, the first variable voltage generator circuit 18a plays a role of reducing the sense current Is. An error of the sense current Is caused by the difference from the design specification of the internal resistance ratio between the main device portion and the sense device portion in the semiconductor switching device (IGBT) Q is corrected by voltage regulation of the non-inversion terminal of such an operational amplifier OP.

In addition, the second variable voltage generator circuit 18b includes a variable voltage generator or a circuit corresponding thereto. The second variable voltage generator circuit 18b plays a role of regulating the sense current by changing the voltage of the non-inversion terminal of the operational amplifier OP. The difference in threshold voltage between the main device portion and the sense device portion in the semiconductor switching device (IGBT) Q is regulated by voltage regulation of the non-inversion terminal of such an operational amplifier OP.

Accordingly, when the current detection circuits 17 equipped with the current correction circuits 18 configured as shown in FIG. 8 are used in place of the aforementioned current detection circuits 11, not only the aforementioned differences in the specifications of the semiconductor switching devices Q and the flywheel diodes D but also the detection errors of the sense currents Is corresponding to the individual differences among the semiconductor switching devices Q1 and Q2 to Q6 and the flywheel diodes D1 and D2 to D6 can be correctly individually. Accordingly, the sense currents Is can be regulated more simply and more accurately than those in the case where the output voltages of the insulating circuits 13 (13a, 13b and 13c) are regulated by the voltage regulation circuits 16 (16a, 16b and 16c) so that the detection accuracy can be improved. Accordingly, more accurate switching control can be made than the previous embodiment.

As described above about the embodiment of the power conversion apparatus according to the invention, the pulse output voltages of the adders 12a, 12b and 12c are held by the sample-and-hold circuits 14a, 14b and 14c every switching period in sync with the switching period of each of the semiconductor switching devices Q in the apparatus. Accordingly, the output voltages of the sample-and-hold circuits 14a, 14b and 14c are stepwise voltage waveforms in which average values of the pulse output voltages of the adders 12a, 12b and 12c are provided consecutively.

Moreover, the output voltages of the sample-and-hold circuits 14a, 14b and 14c are transmitted to the control circuit 20 side through the insulating circuits 13a, 13b and 13c respectively. Accordingly, the change of the average values of the pulse output voltages are hardly affected by the delay response characteristics of the insulating circuits 13a, 13b and 13c but can be accurately transmitted. As a result, accurate switching control of the semiconductor switching devices Q can be made.

Figure 9:
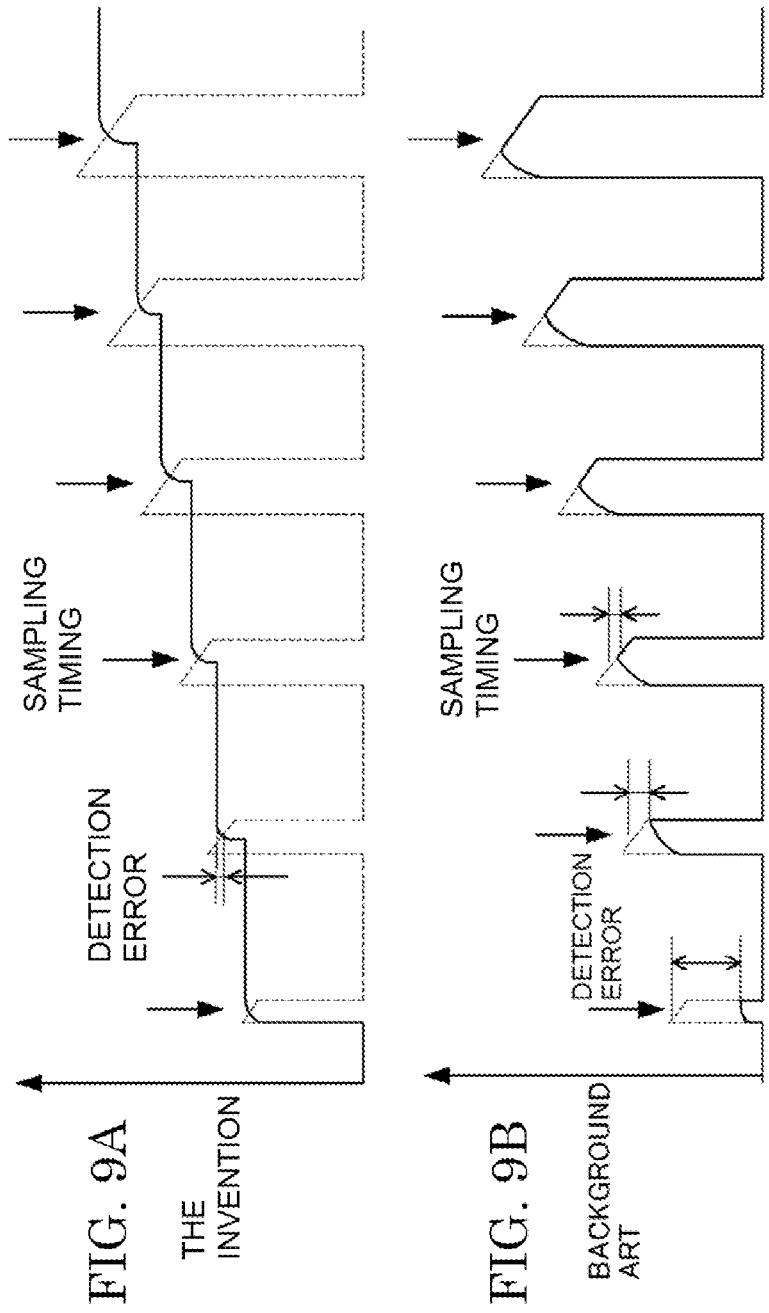
FIG. 9 is a signal waveform graph for explaining advantageous effects of the invention.

Particularly, the output voltages of the insulating circuits 13a, 13b and 13c are for transmitting the stepwise variable output voltages of the sample-and-hold circuits 14a, 14b and 14c. Accordingly, rounding the voltage waveforms caused by the delay response characteristics of the insulating circuits 13a, 13b and 13c only depends on the stepwise voltage change amounts so that the output voltages of the insulating circuits 13a, 13b and 13c can faithfully reproduce the output voltages of the sample-and-hold circuits 14a, 14b and 14c, as shown in FIG. 9(a). Accordingly, errors with respect to the average values of the pulse output voltages of the adders 12a, 12b and 12c can be suppressed sufficiently.

Incidentally, when the pulse output voltages of the adders 12a, 12b and 12c are transmitted directly to the insulating circuits 13a, 13b and 13c, it is undeniable that the output voltages of the insulating circuits 13a, 13b and 13c include large errors in comparison with the pulse output voltages of the adders 12a, 12b and 12c, as shown in FIG. 9(b). Particularly when the pulse width is narrow, the output voltages of the insulating circuits 13a, 13b and 13c return to zero (0) before rising sufficiently. Accordingly, the waveforms of the output voltages are largely different from the waveforms of the input voltages.

In this respect, when the pulse output voltages of the adders 12a, 12b and 12c converted into stepwise voltage waveforms by use of the sample-and-hold circuits 14a, 14b and 14c are transmitted through the insulating circuits 13a, 13b and 13c, the waveforms of the input voltages can be transmitted substantially faithfully, unlike the case where the pulse voltage waveforms are transmitted. Accordingly, as showing in FIGS. 9(a) and 9(b) in which the output voltages of the insulating circuits 13a, 13b and 13c are shown for comparison, transmission errors caused by the delay response characteristics of the insulating circuits 13a, 13b and 13c can be suppressed to the minimum by use of the sample-and-hold circuits 14a, 14b and 14c.

Even when the semiconductor module 10 and the control circuit 20 are separately isolated by use of the insulating circuits 13a, 13b and 13c, currents flowing respectively into the half-bridge circuits of the semiconductor module 10 are detected from the sense currents Is of the switching device Q and the flywheel diodes D simply and accurately in the control circuit 20 so that the semiconductor switching devices Q1 and Q2 to Q6 can be controlled to be switched accurately.

Incidentally, the invention is not limited to the aforementioned embodiments. Although the semiconductor module 10 including three half-bridge circuits constituted by six semiconductor switching devices Q1 and Q2 to Q6 has been described here by way of example, the invention can be also applied to a semiconductor module 10 including two half-bridge circuits. In addition, it is a matter of course that the invention may be also applied to a semiconductor module 10 including one half-bridge circuit. It is also a matter of course that configuration can be made in such manner that a sense current Is of a pair of semiconductor switching devices Q constituting the half-bridge circuit is detected in place of detection of the sense current Is of the flywheel diode D.

Further, any configurations may be properly used as specific configurations of each of the insulating circuits 13a, 13b and 13c as long as the configurations satisfy the specifications of the power conversion apparatus in consideration of the linearity of transmission characteristics of the insulating circuits 13a, 13b and 13c and delay response characteristics thereof. In addition, any circuits may be used as the sample-and-hold circuits 14a, 14b and 14c as long as those circuits have characteristics satisfying the specifications of the power conversion apparatus. In addition, it is matter of course that the invention may be likewise applied to any other converter apparatuses of various types than the aforementioned three-phase AC inverter apparatus, that is, may be applied to any other power conversion apparatuses of various types which have been heretofore proposed. Besides, various modifications may be made on the invention without departing from the gist of the invention.

REFERENCE SIGNS LIST 1 power conversion apparatus
10 semiconductor module
11 (11a, 11b to 11f) current detection circuit
12 (12a, 12b, 12c) adder
13 (13a, 13b, 13c, 13d) insulating circuit
14 (14a, 14b, 14c) sample-and-hold (SH) circuit
15 waveform shaping circuit
16 (16a, 16b, 16c) voltage regulation circuit
17a, 17b to 17f current detection circuit
18 current correction circuit
20 control circuit
21 arithmetic unit
21a AD converter
21b computing portion
21c PWM modulator
22 control portion
23 drive circuit
24 insulating circuit

The invention claimed is:
1. A power conversion apparatus, comprising:
a power semiconductor module having one pair or pairs of semiconductor switching devices which are connected in series to form one half-bridge circuit or half-bridge circuits and which are driven to be ON/OFF while being associated with one another, and a plurality of flywheel diodes back-to-back connected to the semiconductor switching devices respectively;
a control circuit which is provided to be separately isolated from the power semiconductor module and which drives the semiconductor switching devices to be ON/OFF respectively;
current detection circuits which detect currents flowing in the half-bridge circuits through current detection terminals provided in ones of the semiconductor switching devices forming the half-bridge circuits in the power semiconductor module and current detection terminals provided in the flywheel diodes back-to-back connected to the ones of the semiconductor switching devices;
sample-and-hold circuits which hold voltages corresponding to the currents detected through the current detection circuits for a predetermined period of time; and
insulating circuits which transmit the voltages held by the sample-and-hold circuits to the control circuit;
wherein:

voltage signals given from the sample-and-hold circuits through the insulating circuits are inputted to the control circuit after gains and offsets of the voltage signals are regulated through voltage regulation circuits.

2. The power conversion apparatus according to claim 1, wherein:
each of the current detection circuits includes first and second current detection circuits which detect current flowing in a corresponding semiconductor switching device and current flowing in a corresponding flywheel diode respectively, and an adder which adds up outputs of the first and second current detectors.

3. The power conversion apparatus according to claim 2, wherein:
the first and second current detectors have current correction circuits configured to change voltages of the current detection terminals provided in the semiconductor switching device and the flywheel diode respectively and correct currents detected through the current detection terminals.

4. The power conversion apparatus according to claim 1, wherein:
the sample-and-hold circuits sample output signals of the current detection circuits in sync with switching periods of the semiconductor switching devices and hold the output signals until a next sampling time.

5. The power conversion apparatus according to claim 1, wherein:
the power semiconductor module has six semiconductor switching devices forming three half-bridge circuits corresponding to respective phases of a three-phase AC power source, and six flywheel diodes to form an inverter apparatus for a three-phase AC load.

6. The power conversion apparatus according to claim 1, wherein:
the power semiconductor module has one pair or two pairs of the semiconductor switching devices forming one half-bridge circuit or two half-bridge circuits, and the flywheel diodes back-to-back connected to the semiconductor switching devices so that the power semiconductor module and an output circuit connected to an output terminal of the one half-bridge circuit or output terminals of the two half-bridge circuits through inductance form a converter apparatus for controlling a current flowing in the inductance to obtain a predetermined voltage in the output circuit.

* * * * *